US009725084B2

United States Patent
Johri et al.

(10) Patent No.: US 9,725,084 B2
(45) Date of Patent: Aug. 8, 2017

(54) METHODS AND SYSTEM FOR IMPROVING PERFORMANCE OF A HYBRID VEHICLE

(71) Applicant: Ford Global Technologies, LLC, Dearborn, MI (US)

(72) Inventors: Rajit Johri, Canton, MI (US); Jeffrey Allen Doering, Canton, MI (US); Jason Meyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/807,194

(22) Filed: Jul. 23, 2015

(65) Prior Publication Data
US 2017/0021824 A1 Jan. 26, 2017

(51) Int. Cl.
B60W 20/19 (2016.01)
B60W 10/06 (2006.01)
B60W 10/08 (2006.01)
B60W 20/13 (2016.01)

(52) U.S. Cl.
CPC ............ *B60W 20/19* (2016.01); *B60W 10/06* (2013.01); *B60W 10/08* (2013.01); *B60W 20/13* (2016.01); *B60W 2510/0657* (2013.01); *B60W 2510/244* (2013.01); *B60W 2520/06* (2013.01); *B60W 2540/18* (2013.01); *B60W 2710/0666* (2013.01); *B60W 2710/083* (2013.01); *Y10S 903/93* (2013.01)

(58) Field of Classification Search
CPC B60W 20/00–20/19; B60W 2030/043; B60W 30/045; B60W 30/18145–30/18163; B60W 2710/0666
See application file for complete search history.

(56) References Cited

U.S. PATENT DOCUMENTS

| | | | | |
|---|---|---|---|---|
| 5,846,155 | A  * | 12/1998 | Taniguchi | B60K 6/48 180/65.25 |
| 6,523,525 | B1 * | 2/2003 | Hawkins | F01P 11/16 123/396 |
| 8,715,136 | B1 * | 5/2014 | Dai | B60W 10/06 477/5 |
| 2009/0228178 | A1 | 9/2009 | Jess et al. | |
| 2010/0019718 | A1 * | 1/2010 | Salasoo | B60L 3/0046 320/103 |
| 2013/0268162 | A1 * | 10/2013 | Ponziani | B60W 30/00 701/48 |
| 2013/0325291 | A1 | 12/2013 | Kar et al. | |
| 2014/0100727 | A1 * | 4/2014 | Pietron | B60W 10/02 701/22 |
| 2014/0123939 | A1 * | 5/2014 | Bevan | F02D 41/0007 123/337 |

* cited by examiner

*Primary Examiner* — Genna Mott
(74) *Attorney, Agent, or Firm* — David Kelley; McCoy Russell LLP (57) ABSTRACT

Systems and methods for operating a driveline of a hybrid vehicle are described. The systems and methods may improve hybrid driveline performance so that a driver may experience less turbocharger lag and/or less cam phasing lag. The methods and systems may hold engine torque at an elevated level in the presence of a decrease in driver demand torque.

18 Claims, 4 Drawing Sheets

METHODS AND SYSTEM FOR IMPROVING PERFORMANCE OF A HYBRID VEHICLE

FIELD

The present description relates to methods and a system for operating a driveline of a hybrid vehicle. The methods and systems may be particularly useful for hybrid vehicles that may be operated in a performance mode.

BACKGROUND AND SUMMARY

A hybrid vehicle may include an internal combustion engine and an electric machine. The internal combustion engine and the electric machine may be selectively operated to propel the vehicle and recover the vehicle's kinetic energy during deceleration and vehicle braking conditions. The torque demands for the engine and the electric machine may be based on a base strategy that seeks to increase driveline efficiency so that energy consumed by the vehicle is reduced. However, the hybrid vehicle may not perform as is desired under all operating conditions when engine torque and electric machine torque are determined with a primary focus on driveline efficiency.

The inventors herein have recognized the above-mentioned issues and have developed an operating method for a hybrid vehicle, comprising: receiving input to a controller; and maintaining an engine torque and adjusting an electric machine torque via the controller in response to a driving maneuver based on the input and in further response to a decrease in a driver demand torque, the driving maneuver being expected to last less than a threshold duration based on the input.

By maintaining engine torque or adjusting engine torque to a value closest to engine torque immediately before a decrease in driver demand torque, it may be possible to provide the technical result of improving hybrid vehicle performance. For example, an engine that includes a turbocharger and variable valve timing may not respond as quickly as is desired to an increase in driver demand torque following a decrease in driver demand torque because it may take seconds for the valve timing to change and the turbocharger to reach a speed where a desired engine air flow is provided. However, engine torque may be maintained at or near engine torque before the decrease in driver demand torque while still providing the driver demand torque in combination with the electric machine. Specifically, engine torque may be maintained or adjusted to a torque near the engine torque before the decrease in driver demand torque by increasing magnitude of negative electric machine torque while the engine operates. The magnitude of electric machine torque may be decreased after a driving maneuver to make a large amount of engine torque available almost immediately. In this way, hybrid vehicle performance may be improved so that a driveline torque production is not delayed after performing a maneuver, such as negotiating a road turn in a vehicle.

The present description may provide several advantages. Specifically, the approach may reduce driveline torque production hesitation. In addition, the approach may be selectively applied so that energy consumption remains low during less aggressive driving. Further, the approach may be applied to both parallel and serial hybrid drivelines.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
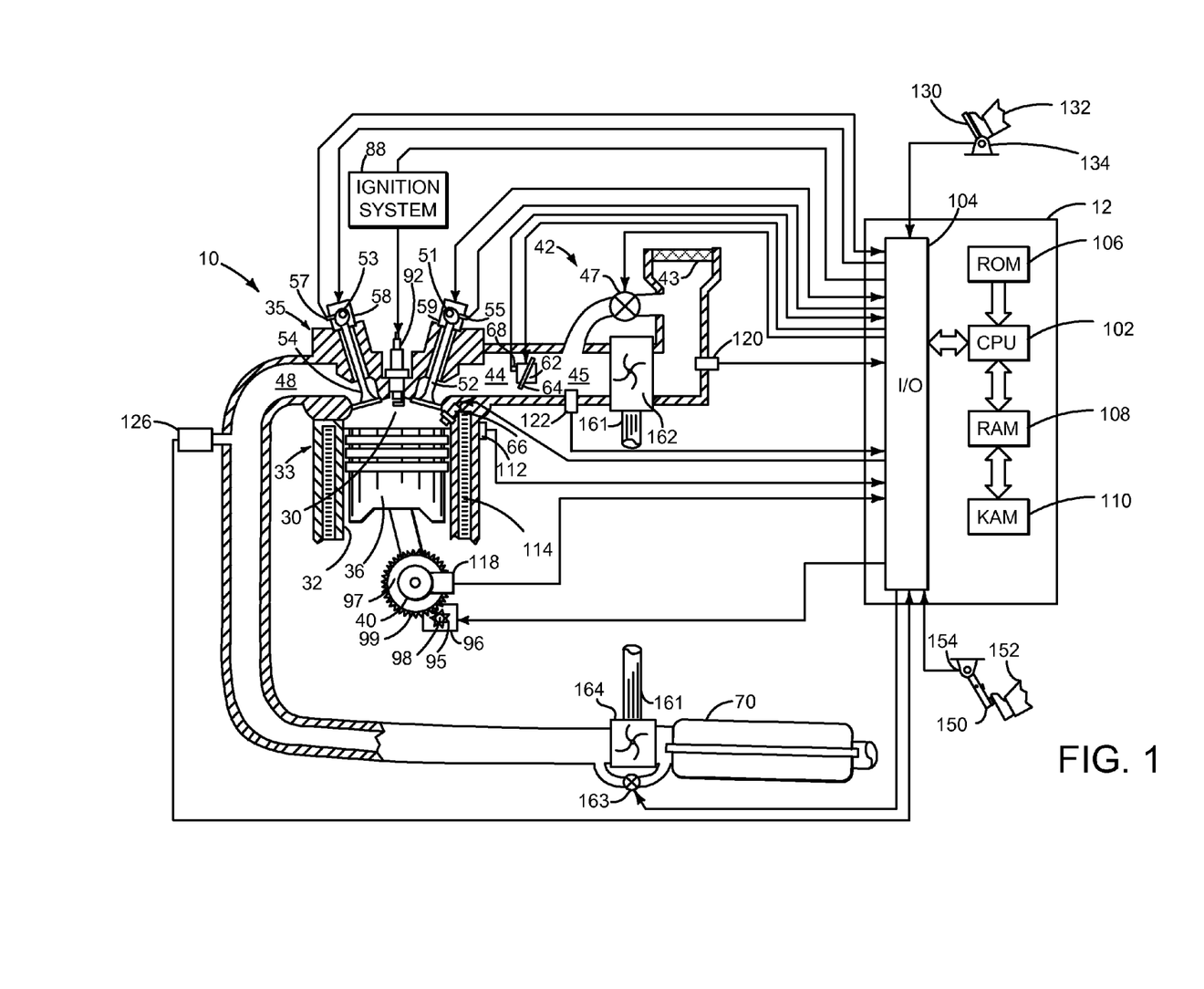
FIG. 1 is a schematic diagram of an engine.
Figure 2:
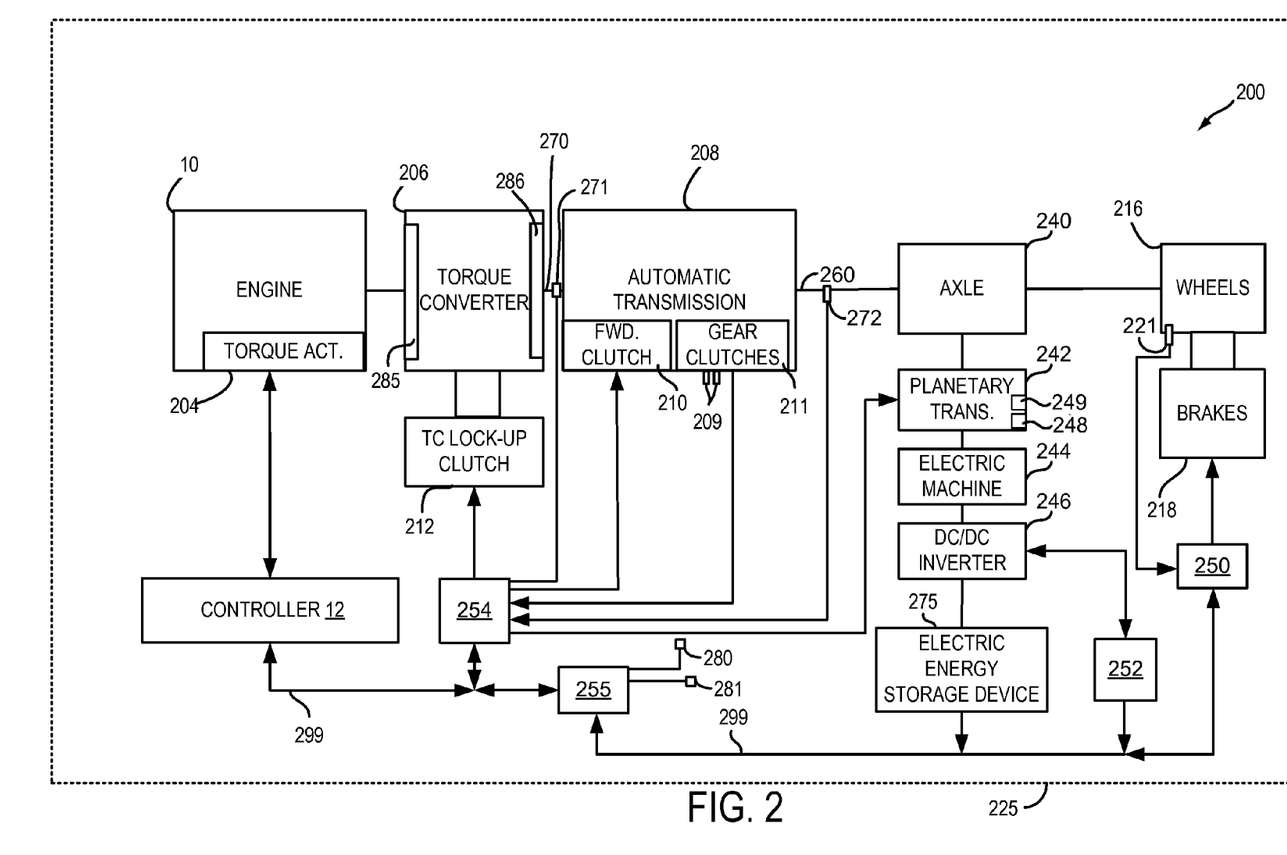
FIG. 2 is a schematic diagram of a hybrid vehicle driveline.
Figure 3:
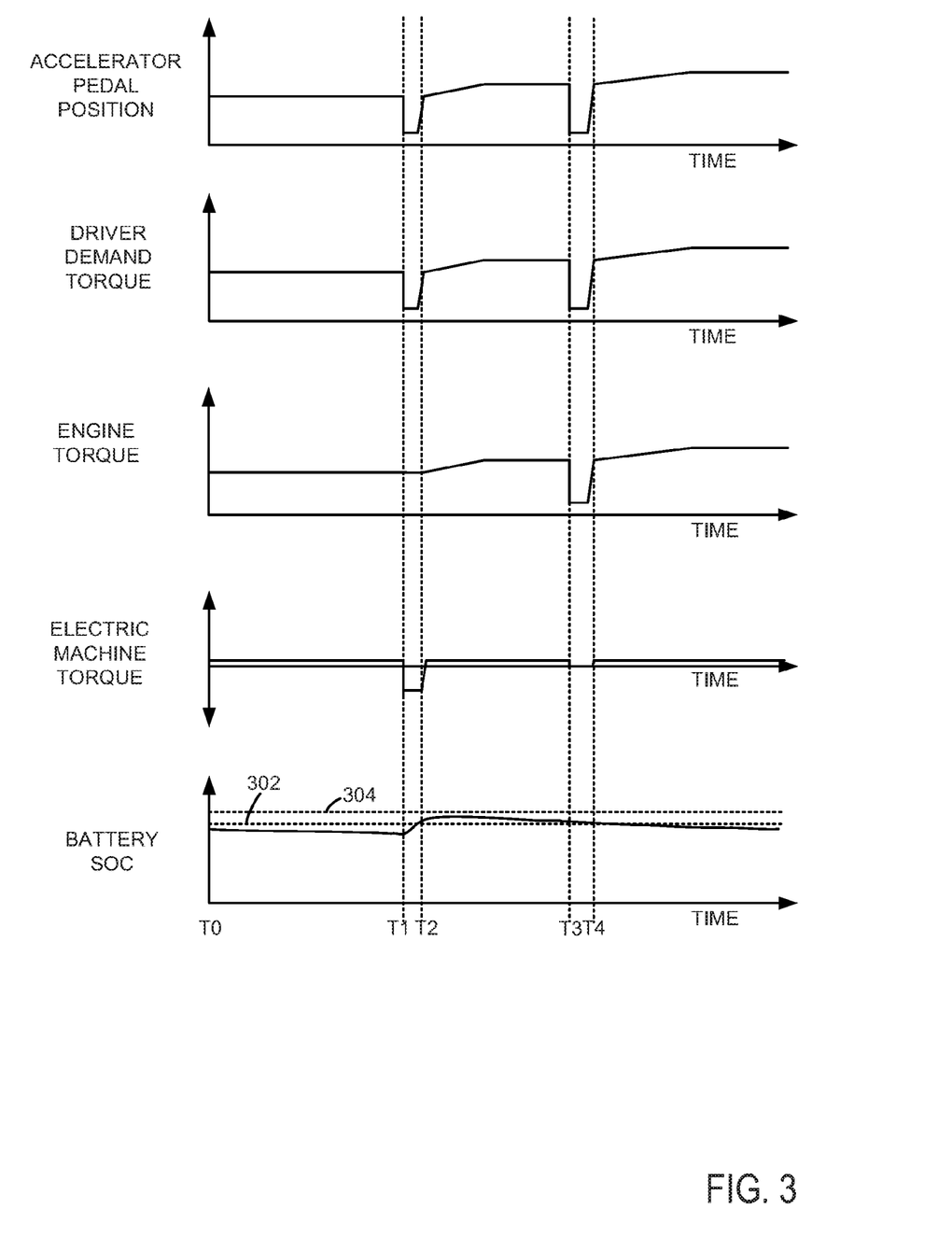
FIG. 3 shows an example hybrid vehicle operating sequence.

The present description is related to improving performance of a driveline of a hybrid vehicle during regeneration. The hybrid vehicle may include an engine as is shown in FIG. 1. The engine of FIG. 1 may be included in a driveline as is shown in FIG. 2. The driveline may be operated as is shown in FIG. 3. The driveline operates according to the method shown in FIG. 4.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown).

In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a driveline 200. However, the method described herein is applicable to other configurations. For example, the method of FIG. 4 may be applied to a system where an engine is selectively coupled to an electric machine via a disconnect clutch, and the electric machine is mechanically coupled to a step ratio transmission.

The driveline of FIG. 2 includes engine 10 shown in FIG. 1. Driveline 200 is shown including vehicle system controller 255, engine controller 12, electric machine controller 252, transmission controller 254, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque to provide a desired rate of vehicle deceleration. The desired wheel torque may be provided by vehicle system controller requesting a first braking torque from electric machine controller 252 and a second braking torque from brake controller 250, the first and second torques providing the desired braking torque at vehicle wheels 216.

In other examples, the partitioning of controlling driveline devices may be partitioned differently than is shown in FIG. 2. For example, a single controller may take the place of vehicle system controller 255, engine controller 12, electric machine controller 252, transmission controller 254, and brake controller 250.

In this example, driveline 200 may be selectively powered by engine 10 and electric machine 244. In other examples, engine 10 may be omitted.

Electric machine 244 is in electrical communication with DC/DC inverter 246 and in mechanical communication with two speed planetary transmission 242. DC/DC inverter supplies electrical power to and receives electrical power from electric energy storage device 275. Electrical energy storage device 275 may include a controller to regulate battery state of charge and output battery control parameters such as battery state of charge, battery voltage, etc. Alternatively, controller 252 may perform these functions. Planetary transmission 242 may include two or more gears 248 that may be activated or deactivated via clutches 249. Planetary transmission 242 is mechanically coupled to axle 240. Planetary transmission 242 may be shifted via controller 254. The electric machine 244 and planetary transmission 242 may be described as an electric torque path.

Engine output torque may be transmitted to torque converter impeller 285 of torque converter 206. Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 206 by adjusting the torque converter lock-up clutch 212 in response to various engine operating conditions, or based on a driver-based engine operation request.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may be relayed to axle 240 via output shaft 260. Specifically, automatic transmission 208 may transfer an input driving torque at the input shaft 270 responsive to a vehicle traveling condition before transmitting an output driving torque to axle 240. The mechanical torque path includes engine 10, torque converter 206 and automatic transmission 208. Transmission controller 254 selectively activates or engages TCC 212, gear clutches 211, and forward clutch 210. Transmission controller also selectively deactivates or disengages TCC 212, gear clutches 211, and forward clutch 210. Transmission controller also selectively activates and deactivates clutches 249 to activate and deactivate gears 248.

Axle 240 combines torque from the mechanical path with torque from the electrical path to rotate wheels 216. A frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque from an accelerator pedal or other device. Vehicle system controller 255 then allocates a fraction of the requested driver demand torque to the engine 10 and the remaining fraction to the electric machine 244. Vehicle system controller 255 requests the engine torque from engine controller 12 and the electric machine torque from electric machine controller 252.

Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative electric machine torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the electric machine 244 (e.g., desired driveline wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 248 based on a unique shifting schedule to increase regeneration efficiency. Electric machine 244 supplies a negative torque to axle 240, but negative torque provided by electric machine 244 may be limited by transmission controller 254 which outputs a planetary transmission input shaft negative torque limit (e.g., not to be exceeded threshold value). Further, negative torque of electric machine 244 may be limited (e.g., constrained to less than a threshold negative threshold torque) based on operating conditions of electric energy storage device 275, by vehicle system controller 255, or electric machine controller 252. Any portion of desired negative wheel torque that may not be provided by electric machine 244 because of transmission or electric machine limits may be allocated to friction brakes 218 so that the desired wheel torque is provided by a combination of negative wheel torque from friction brakes 218 and electric machine 244.

Accordingly, torque control of the various driveline components may be supervised by vehicle system controller with local torque control for the engine 10, transmission 208, electric machine 244, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 244 by adjusting current flowing to and from field and/or armature windings of the electric machine as is known in the art.

Transmission controller 254 receives transmission input shaft position via position sensor 271. Transmission controller 254 may convert transmission input shaft position into input shaft speed via differentiating a signal from position sensor 271. Transmission controller 254 may receive transmission output shaft torque from torque sensor 272. Alternatively, sensor 272 may be a position sensor or torque and position sensors. If sensor 272 is a position sensor, controller 254 differentiates a position signal to determine transmission output shaft velocity. Transmission controller 254 may also differentiate transmission output shaft velocity to determine transmission output shaft acceleration.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Vehicle system controller 255 may also receive other vehicle information such as positioning information from global positioning system 280 and steering angle sensor 281 to determine if the vehicle is expected to perform a short duration maneuver such as negotiating a turn.

Referring now to FIG. 3, an example operating sequence is shown. The sequence of FIG. 3 may be provided by the system of FIGS. 1 and 2 according to the method of FIG. 4. The plots shown in FIG. 3 are aligned in time. Vertical markers T0-T4 represent times of particular interest in the sequence.

The first plot from the top of FIG. 3 is a plot of accelerator pedal position versus time. The accelerator pedal may be operated via a driver. The vertical axis represents accelerator pedal position and accelerator pedal position increases (e.g., is applied or depressed further) in the direction of the vertical axis arrow. The horizontal axis represents time and time increases from the left side of the plot to the right side of the plot.

The second plot from the top of FIG. 3 is a plot of driver demand torque versus time. In one example, the driver demand torque corresponds to a desired wheel torque. The vertical axis represents driver demand torque and driver demand torque increases in the direction of the vertical axis arrow. The horizontal axis represents time and time increases from the left side of the plot to the right side of the plot.

The third plot from the top of FIG. 3 is a plot of engine torque versus time. The vertical axis represents engine torque and engine torque increases in the direction of the vertical axis arrow. The horizontal axis represents time and time increases from the left side of the plot to the right side of the plot.

The fourth plot from the top of FIG. 3 is a plot of electric machine torque versus time. The vertical axis represents electric machine torque. Positive electric machine torque is above the horizontal axis and negative electric machine torque is below the horizontal axis. The magnitude of positive torque increases in a direction of the vertical axis arrow above the horizontal axis. The magnitude of negative torque increases in a direction of the vertical axis arrow below the horizontal axis.

The fifth plot from the top of FIG. 3 is a plot of battery state of charge (SOC) versus time. The vertical axis represents battery state of charge and battery state of charge increases in the direction of the vertical axis arrow. The horizontal axis represents time and time increases from the left side of the plot to the right side of the plot. Horizontal line 302 is a threshold battery state of charge above which battery charging is reduced as compared to battery charging below line 302. Horizontal line 304 is a threshold level for a maximum battery state of charge that is not to be exceeded.

At time T0, the accelerator pedal position is applied to a middle level and the driver demand torque is also at a middle level. The engine torque is at a middle level and the motor torque is a small positive value. The battery state of charge is at a higher level, but below threshold 302.

At time T1, the driver (not shown) releases the accelerator pedal to reduce the driver demand torque. However, because controller inputs indicate a short duration vehicle maneuver is expected, engine torque is held at its value prior to the decrease in accelerator pedal position and driver demand torque. Instead, the electric machine torque changes from a positive torque to a negative torque. The negative electric machine torque combined with the present engine torque provides the driver demand torque. The battery state of charge also increases since the electric machine supplies electrical energy to the battery via operating in a charging mode. Further, if the road grade is negative or vehicle deceleration is desired, the vehicle may operate in a regeneration mode where the vehicle's kinetic energy is converted into electrical energy via the electric machine.

Between time T1 and time T2, the battery state of charge continues to increase as the electric machine outputs electrical energy to the battery by operating as a generator. The accelerator pedal position is at a lower level and the driver demand torque is also at a lower level. The engine torque continues at a level it was at prior to the decrease in driver demand torque. By holding engine torque at a level it assumed prior to the decrease in driver demand torque, turbocharger lag and cam indexing (moving) may be reduced so that engine torque is available immediately when driver demand torque increases.

At time T2, the driver (not shown) applies the accelerator pedal and increases driver demand torque. The vehicle exits regenerative braking mode as indicated by the electric machine torque transitioning from a negative value to a positive value. Consequently, the engine torque is made available to drive the vehicle's wheels and the battery ceases charging. The driver demand torque is met by reducing the magnitude of the negative electric machine torque.

Between time T2 and time T3, the accelerator pedal position gradually increases and the driver demand torque increases with the accelerator pedal position. The engine torque also increases and the motor torque remains at a lower level. The battery state of charge is greater than threshold 302.

At time T3, the driver (not shown) releases the accelerator pedal a second time while controller inputs indicate a short duration vehicle maneuver. But, because battery state of charge is greater than threshold 302, electric machine torque is reduced but the electric machine does not operate in a generator mode charging the battery. Instead, the engine torque is reduced based on the driver demand torque and the reduction in electric machine torque. The engine torque plus the electric machine torque is equal to the driver demand torque. Thus, the engine torque is reduced by an amount that provides the driveline torque equivalent to driver demand torque when the electric machine is not available to provide negative torque.

Between time T3 and time T4, the battery state of charge is maintained because the electric machine output is near zero so that the engine may provide as much of the driver demand torque without assistance from the electric machine. As such, the engine torque output is at a level of the driver demand torque. In this way, the engine torque may be adjusted to a highest engine torque near the driver demand torque without the driver demand torque being exceeded. By operating the engine at the torque near the driver demand torque, turbocharger lag and cam timing adjustment delays may be reduced.

At time T4, the driver (not shown) applies the accelerator pedal and increases driver demand torque. The electric machine is activated to provide a small positive torque. The electric machine torque added with the engine torque equals the driver demand torque. The electric machine is operated in a motoring mode to consume battery charge so that the motor may operate in a generator mode during a subsequent decrease in driver demand torque. The engine torque is also increased, but because engine torque was reduced at time T3, there may be a small delay in engine torque production at time T4.

In this way, hybrid vehicle performance may be improved by allowing an engine to operate at a torque where driveline torque may be increased almost instantaneously via reducing a magnitude of negative electric machine torque. Such driveline operation may be beneficial for operating a hybrid vehicle on a race track or while operating the hybrid vehicle in a sport mode where a driver wishes to drive more aggressively on a road having many turns.

Figure 4:
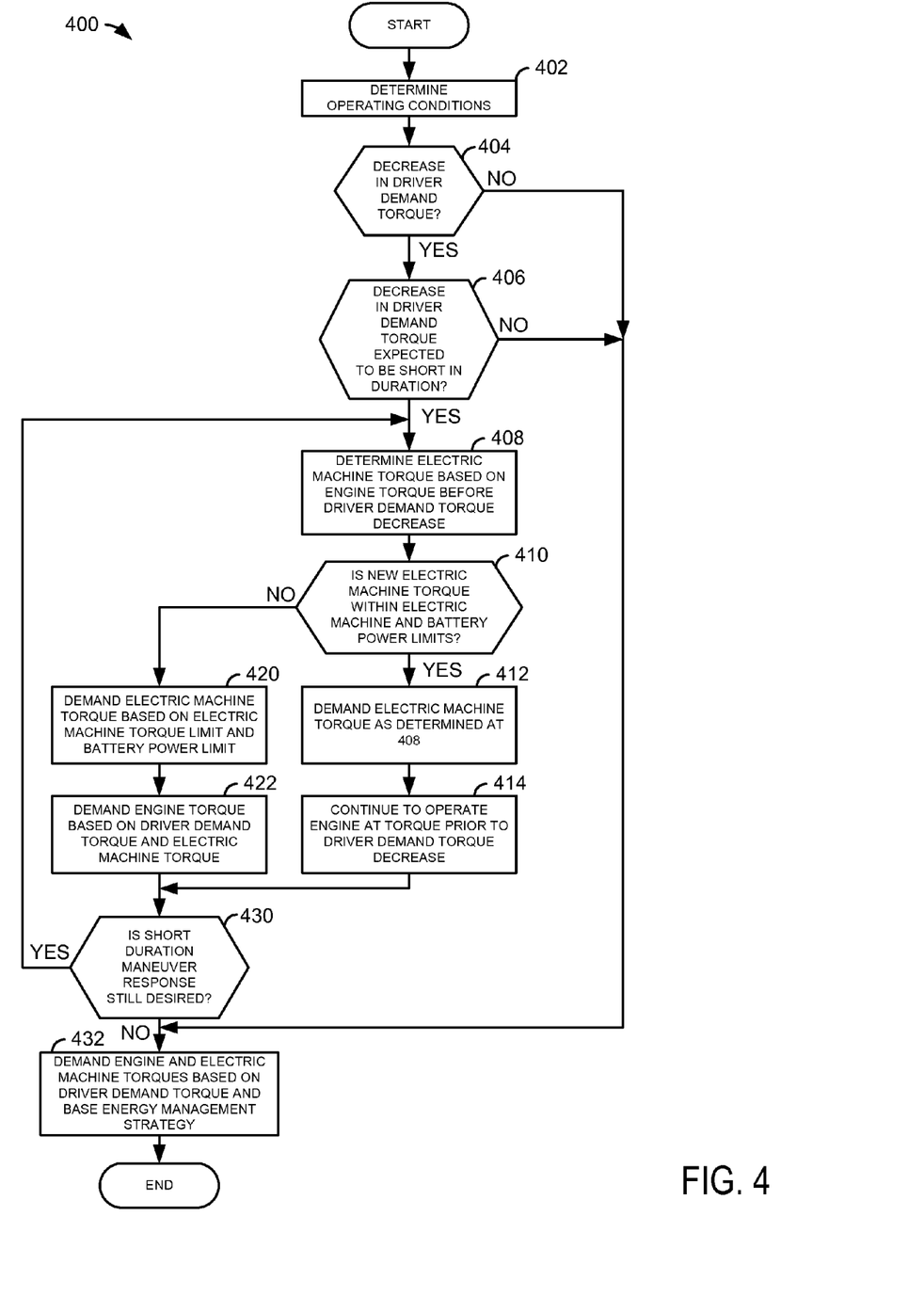
FIG. 4 shows an example method for operating a vehicle driveline.

Referring now to FIG. 4, a method for operating a vehicle driveline is shown. At least portions of method 400 may be implemented as executable controller instructions stored in non-transitory memory. Additionally, portions of method 400 may be actions taken in the physical world to transform an operating state of an actuator or device.

At 402, method 400 determines vehicle operating conditions. Vehicle operating conditions may include but are not limited to vehicle speed, driver demand torque, steering angle, battery state of charge, vehicle location, accelerator pedal position, and brake pedal position. Vehicle operating conditions may be determined via a controller querying its inputs. Method 400 proceeds to 404 after operating conditions are determined.

At 404, method 400 judges if there is a decrease in driver demand torque. A decrease in driver demand torque may be determined via monitoring accelerator pedal position. The decrease in driver demand torque is not required to be a complete release of the accelerator pedal. If method 400 judges that there is a decrease in driver demand torque, the answer is yes and method 400 proceeds to 406. Otherwise, the answer is not and method 400 proceeds to 432.

At 406, method 400 judges if the decrease in driver demand torque is expected to be for a short time duration. In one example, method 400 may judge that the driver demand torque is expected to last for a short duration in response to vehicle inputs that indicate vehicle maneuvers. For example, if the steering angle indicates that the vehicle is beginning to turn, method 400 may indicate that the driver demand torque is expected to be reduced for a short time duration (e.g., less than 5 seconds). Similarly, method 400 may indicate that the driver demand torque is expected to be reduced for a short time duration based on the vehicle entering a turn based on global positioning satellite information. Determination that the vehicle is performing a specific maneuver may be indicative that it is likely that the driver will request a torque increase after at least a portion of the maneuver is completed. Therefore, it may be desirable to operate the engine at a torque level at a time immediately before the decrease in driver demand torque so that engine torque may be available when the driver applies the accelerator pedal. If method 400 judges that the decrease in driver demand torque is expected to be for a short duration, the answer is yes and method 400 proceeds to 408. Otherwise, the answer is no and method 400 proceeds to 432.

At 408, method 400 determines an electric machine torque based on engine torque immediately before the decrease in driver demand torque. In one example, the electric machine torque is given by the equation:

$$E_T = DD_T - EN_{TBTO}$$

where $E_T$ is electric machine torque after the decrease in driver demand torque, $DD_T$ is driver demand torque after the decrease in driver demand torque, and $EN_{TBTO}$ is engine torque immediately before the decrease in driver demand torque. For example, if engine torque immediately before the decrease in driver demand torque is 70 N-m and driver demand torque after the decrease in driver demand torque is 30 N-M, the electric machine torque is −40 N-m.

Alternatively, method 400 may determine a desired turbocharger compressor speed and engine torque based on the desired turbocharger compressor speed. In one example the desired turbocharger compressor speed is above a threshold compressor speed where a desired compressor flow rate may be provided. For example, if the desired turbocharger compressor speed is 140,000 RPM and the turbocharger compressor volumetric flow rate is 0.06 m³/second, the engine may be operated at a load at its present speed such that air flow through the engine is within a threshold flow rate of the turbocharger compressor volumetric flow rate. The engine air flow rate may be converted to an estimated engine torque and electric machine torque may be determined based on the following equation:

$$E_T = DD_T - EN_{TBTS}$$

where $E_T$ is electric machine torque after the decrease in driver demand torque, $DD_T$ is driver demand torque after the decrease in driver demand torque, and $EN_{TBTS}$ is engine torque based on a desired turbine speed. By operating the turbocharger at a compressor speed above a threshold speed, it may be possible to reduce turbocharger lag. Method 400 proceeds to 410 after motor torque is determined.

At 410, method 400 judges if electric machine torque determined at 408 (the new electric machine torque), is within electric machine torque and battery power limits. For example, the electric machine negative torque limit (e.g., not to exceed value) may be X N-m and the electric machine positive torque limit (e.g., not to exceed value) may be Y N-m. If the electric machine torque determined at 408 is positive and greater than Y N-m, the answer is no and method 400 proceeds to 420. If the electric machine torque determined at 408 is negative and has a greater magnitude than X N-m, the answer is no and method 400 proceeds to 420. Otherwise, the answer may be yes, and method 400 may proceed to 412.

Further, battery power limits may also be a basis for determining electric machine limits. For example, if the battery state of charge is high and battery power is limited to X Kw/hr, electric machine torque is limited (not to be exceeded) to a torque that provides less than or equal to X Kw/hr of charge to the battery. If the electric machine torque determined at 408 is greater in magnitude than the electric machine torque limit based on battery charge, the answer is no and method 400 proceeds to 420. Otherwise, the answer is yes and method 400 proceeds to 412.

At 412, method 400 demands an electric machine torque equivalent to the electric machine torque determined at 408. The electric machine torque may be demanded via commanding a DC/DC converter to output a specified current and/or voltage. Method 400 may also shift gears in transmission 242 to provide a desired driver demand torque at vehicle wheels. Method 400 proceeds to 414 after electric machine torque is demanded.

At 414, method 400 demands engine torque equal to engine torque commanded immediately before the decrease in driver demand torque was determined. The engine torque may be commanded via opening a throttle, adjusting cam timing, spark timing, and boost pressure. Thus, the engine cam timing, boost, and spark timing may be maintained at same values as immediately before the decrease in driver demand torque. Method 400 may also shift gears in transmission 208 to provide a desired driver demand torque at vehicle wheels. Method 400 proceeds to 430 after the engine torque is demanded.

At 430, method 400 judges if the short duration driving maneuver is complete or if the short duration driver demand torque response is still desired. Method 400 may judge that the short duration driving maneuver is complete when the accelerator pedal is applied or increased from a previous position. If the accelerator pedal has not been applied, method 400 may judge that the short duration maneuver response is still desired. Further, method 400 may judge that the short duration driving maneuver is complete based on an amount of time since the driver demand torque was reduced (e.g., 5 seconds). If method 400 determines that a threshold amount of time since driver demand torque was reduced has not expired, method 400 may judge that the short duration maneuver response is still desired. If method 400 judges that the response to the expected short duration driving maneuver is still desired, the answer is yes and method 400 returns to 408. Otherwise, the answer is no and method 400 proceeds to 432.

At 432, method 400 demands engine torque and electric machine torque in response to driver demand torque and vehicle speed based on a base energy management strategy. The base energy management strategy may reduce engine torque and electric machine torque in response to a reduction in driver demand torque to conserve energy. The engine cam timing, boost, and spark timing may be adjusted responsive to engine speed and load. Method 400 proceeds to exit after engine and electric machine torque are adjusted.

At 420, method 400 demands electric machine torque based on electric machine torque limits and a battery power limit. For example, an electric machine may have a positive torque limit of Y (e.g., 100) N-m and a negative torque limit of X (e.g., −100) N-m, the limits are not to exceed values. Thus, the electric machine may provide between X and Y N-m of torque. The magnitude of electric machine torque is not to exceed the negative and positive torque limits. Further, the electric machine torque may be limited to a value based on an amount of power vehicle batteries may accept during charging. For example, a battery may be capable of receiving 10 Kw/sec which corresponds to Z N-m of electric machine negative torque. Therefore, the electric machine negative torque magnitude is constrained to less than Z N-m.

The electric machine torque is commanded to a torque nearest the torque determined at 408 that does not exceed the electric machine positive and negative torque limits or the battery power limit. For example, if the negative battery torque limit is −50 N-m and method 400 determined a value of −60 N-m at 408, method 400 commands −50 N-m. Method 400 may also shift gears in transmission 242 to provide a desired driver demand torque at vehicle wheels. Method 400 proceeds to 422 after the electric machine torque is commanded.

At 422, method 400 demands engine torque based on the driver demand torque and the electric machine torque determined at 420. In one example, method 400 determines engine torque based on the following equation:

$$EN_T = DD_T - E_T$$

where $E_T$ is electric machine torque after the decrease in driver demand torque determined at 420, $DD_T$ is driver demand torque after the decrease in driver demand torque, and $EN_T$ is engine torque after the decrease in driver demand torque. The engine is commanded to the determined engine torque via adjusting one or more torque actuators including a throttle, camshaft, and spark timing. Method 400 may also shift gears in transmission 208 to provide a desired driver demand torque at vehicle wheels Method 400 proceeds to 430 after engine torque is commanded.

In this way, engine torque may be maintained during the duration of a short duration driving maneuver. Alternatively, engine torque may be held to a torque closest to the torque the engine output immediately before a reduction in driver demand torque based on electric machine torque limits and battery power limits.

Thus, the method of FIG. 4 provides for an operating method for a hybrid vehicle, comprising: receiving input to a controller; and maintaining an engine torque and adjusting an electric machine torque via the controller in response to a driving maneuver based on the input and in further response to a decrease in a driver demand torque, the driving maneuver being expected to last less than a threshold duration based on the input. The method includes where the electric machine torque and the engine torque provide the driver demand torque. The method includes where the electric machine torque provides a negative torque to a vehicle driveline.

In some examples, the method includes where the engine torque is maintained at a torque an engine outputs before the decrease in driver demand torque. The method further comprises shifting a transmission downstream of the electric machine while maintaining the engine torque. The method further comprises shifting a transmission downstream of the engine while maintaining the engine torque. The method includes where engine speed is allowed to vary while maintaining the engine torque.

The method of FIG. 4 also provides for an operating method for a hybrid vehicle, comprising: receiving input to a controller; and maintaining an engine turbocharger compressor speed above a threshold speed and adjusting an electric machine torque via the controller in response to a driving maneuver based on the input and in further response to a decrease in a driver demand torque, the driving maneuver being expected to last less than a threshold duration based on the input. The method includes where the driving maneuver is turning the hybrid vehicle. The method includes where the turbocharger compressor speed is maintained via maintaining a threshold air flow amount through an engine. The method includes where the electric machine torque and an engine torque provide the driver demand torque. The method further comprises maintaining engine cam timing at a timing that is based on an engine torque provided by an engine immediately before the decrease in driver demand torque, and adjusting cam timing in response to engine speed and load after an increase in driver demand torque.

The method of FIG. 4 also provides for an operating method for a hybrid vehicle, comprising: receiving input to a controller; and adjusting an engine torque to a first torque that when combined with a limited electric machine torque provides a driver demand torque via the controller in response to a driving maneuver based on the input and in further response to a decrease in a driver demand torque, the driving maneuver being expected to last less than a threshold duration based on the input, a value of the first torque nearest to a value of engine torque immediately before the decrease in driver demand torque. The method includes where the limited electric machine torque is a negative torque. The method includes where the limited electric machine torque is a maximum negative electric machine torque. The method includes where the limited electric machine torque is based on a battery charging limit. The method includes where the driving maneuver is turning a vehicle. The method includes where the input is received via a steering angle sensor. The method includes where the input is a global positioning system signal. The method further comprises decreasing engine output in response to an amount of time after the decrease in driver demand torque exceeding the threshold duration.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, hybrid electric vehicles including engines operating in natural gas, gasoline, diesel, or alternative fuel configurations could use the present description to advantage.

The invention claimed is:

1. An operating method for a hybrid vehicle, comprising:
receiving an input from a sensor that indicates hybrid vehicle turning to a controller;
determining that a turning maneuver is expected to last less than a threshold duration based on the input; and
maintaining an engine torque and adjusting an electric machine torque via the controller in response to the determined turning maneuver, and where adjusting the electric machine torque includes adjusting the electric machine torque based on an engine torque immediately preceding a decrease in a driver demand torque.

2. The method of claim 1, further comprising:
maintaining the engine torque and adjusting the electric machine torque in further response to the decrease in the driver demand torque;
where maintaining the engine torque and adjusting the electric machine torque provides the driver demand torque.

3. The method of claim 2, where maintaining the engine torque and adjusting the electric machine torque includes the electric machine torque providing a negative torque to a vehicle driveline.

4. The method of claim 2, where maintaining the engine torque and adjusting the electric machine torque includes outputting a torque an engine outputs before the decrease in driver demand torque.

5. The method of claim 4, further comprising shifting a transmission downstream of the electric machine while maintaining the engine torque.

6. The method of claim 1, further comprising allowing engine speed to vary while maintaining the engine torque.

7. An operating method for a hybrid vehicle, comprising:
receiving an input from a steering angle sensor to a controller; and
maintaining an engine turbocharger compressor speed above a threshold speed and adjusting an electric machine torque via the controller in response to a turning maneuver predicted to last less than a threshold duration, the turning maneuver based on the input.

8. The method of claim 7, where the driving maneuver is turning the hybrid vehicle, and where adjusting the electric machine torque includes adjusting the electric machine torque based on an engine torque immediately preceding a decrease in a driver demand torque; and further comprising:
maintaining the engine turbocharger compressor speed above the threshold speed and adjusting the electric machine torque via the controller in response the decrease in driver demand torque.

9. The method of claim 7, where maintaining the engine turbocharger compressor speed includes maintaining a threshold air flow amount through an engine.

10. The method of claim 7, further comprising providing a driver demand torque via the electric machine torque and an engine torque.

11. The method of claim 7, further comprising maintaining engine cam timing at a timing that is based on an engine torque provided by an engine immediately before a decrease in driver demand torque, and adjusting cam timing in response to engine speed and load after an increase in driver demand torque.

12. An operating method for a hybrid vehicle, comprising:
receiving an input from a sensor that indicates hybrid vehicle turning to a controller; and
adjusting an engine torque to a first torque that when combined with a limited electric machine torque provides a driver demand torque in response to a turning maneuver and a decrease in the driver demand torque, the turning maneuver based on the input and predicted to last less than a threshold duration, a value of the first torque being equal to the driver demand torque minus the limited electric machine torque after the decrease in the driver demand torque.

13. The method of claim 12, where the limited electric machine torque is a negative torque, and where the first torque is a torque based on the limited electric machine torque.

14. The method of claim 13, where the limited electric machine torque is a threshold electric machine torque, and further comprising:
adjusting an electric machine torque based on engine torque immediately preceding the decrease in the driver demand torque in response to the electric machine torque being within power limits of an electric machine.

15. The method of claim 12, where the limited electric machine torque is based on a battery charging limit.

16. The method of claim 12, where the input is received via a steering angle sensor.

17. The method of claim 12, where the input is a global positioning system signal.

18. The method of claim 12, further comprising decreasing engine output in response to an amount of time after the decrease in the driver demand torque exceeding the threshold duration.

* * * * *